Nov. 18, 1969 R. F. HORNBECK 3,478,886
GRAFT-COPOLYMER COLUMN SUPPORT MATERIAL FOR LIQUID-LIQUID
PARTITION CHROMATOGRAPHY
Filed March 31, 1967
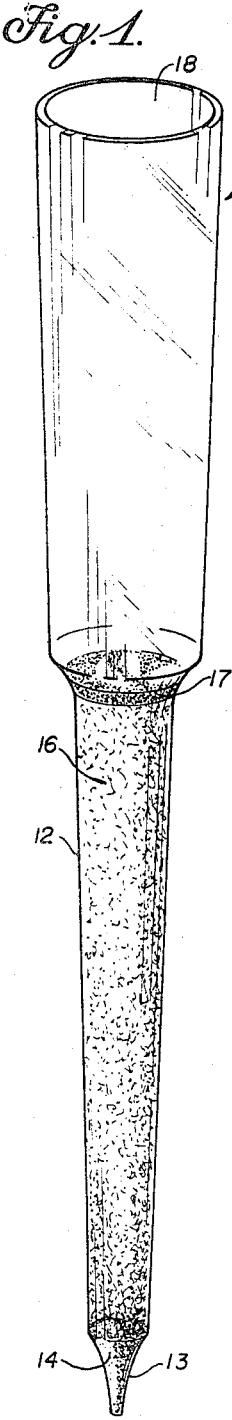
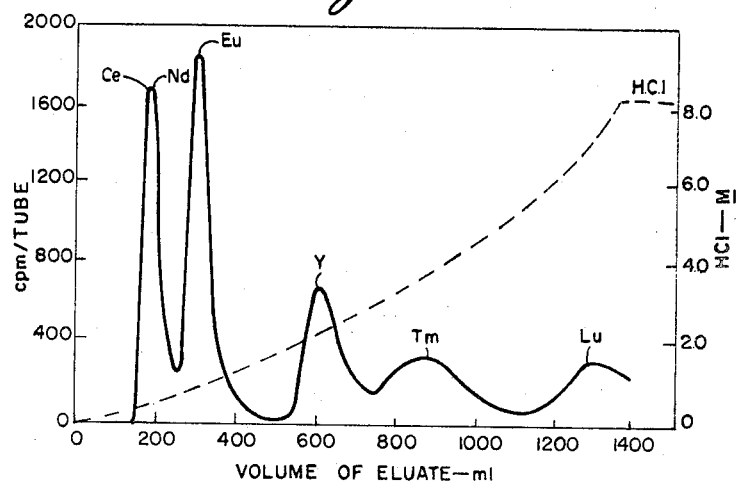
INVENTOR.
ROBERT F. HORNBECK
BY
ATTORNEY

United States Patent Office 3,478,886
Patented Nov. 18, 1969

3,478,886
GRAFT-COPOLYMER COLUMN SUPPORT MATERIAL FOR LIQUID-LIQUID PARTITION CHROMATOGRAPHY
Robert F. Hornbeck, Livermore, Calif., assignor to the United States of America as represented by the United States Atomic Energy Commission
Filed Mar. 31, 1967, Ser. No. 628,249
Int. Cl. B01d 23/10
U.S. Cl. 210—198                                9 Claims

ABSTRACT OF THE DISCLOSURE

A graft copolymer chromatography column substrate material or column packing material, comprising polytrifluorochloroethylene powder having copolymerized and crosslinked polyethylene glycol and styrene chemically bonded to the powder particle surfaces to confer upon the material hydrophilic and organophilic properties for improved retention and transmission of organic and aqueous eluant phases in chromatographic columnar and non-chromatographic liquid-liquid partitions.

Background of the invention

The present invention relates to liquid-liquid partition chromatographic column support media in the form of dense chemically inert polymer particles having a copolymerized mixture of monomers, having hydrophilic and organophilic properties, attached by valence bonds grafted to the surfaces thereof.

Liquid-liquid extraction is a technique which has been employed for decades for separating chemical species. Today, extensive compilations of solubility data and distribution coefficients are readily available in the literature. Since, for any two distinct chemical species, regardless of similarity, there exists one or more solvent pairs for which the distribution coefficients of these species are different, coupled with the ready access to such data in the literature, liquid-liquid extraction is today a most versatile tool for separating compounds in solution.

The basic approach to liquid-liquid extraction is, of course, to thoroughly mix two or more solvent phases including the chemical species to be separated in a conventional separatory funnel so that there is a differential partition of chemical species between the phases, and to physically separate the phases having different chemical species or concentrations thereof to provide a separation of such species. If the distribution coefficients of the species are sufficiently different, they can be separated in a few successive extractions which are easily carried out in a separatory funnel. However, for separating compounds which have similar characteristics and accordingly similar distribution coefficients, an undue number of successive separations is required which renders the use of separatory funnels impractical.

Description of the prior art

Various automated flow systems have been developed which are capable of satisfactorily fractionating mixtures of various compounds including those very similar solvent properties. Another approach to the problem is to utilize what has become known as reverse phase partition chomatography. In this process, one liquid phase is absorbed onto a substrate support in a chromatographic column, forming a more or less stationary liquid film, and then another liquid, the mobile phase, is transported in progressive contact past the stationary phase. The different chemical species are continuously redistributed between the mobile and liquid phases, and become separated because the individual species have different distribution properties between the phases and therefore progress through the column at different velocities, e.g., in the order of their relative affinities for the mobile phase. The theory and detailed mechanism of reverse phase partition chromatography is described in the literature, e.g., in an article entitled "Chromatography," Encyclopedia of Chemical Technology, published by Interscience Publishing Company, page 413.

The packing material which serves as substrate for adsorption of the stationary phase is generally a substance which has a high affinity for one of the extraction liquids and not the other. One packing material commonly used is a finely divided fluorocarbon polymer. By their very nature, i.e., finely-divided particulate loading, the columns offer a high impedance to the flow of the mobile phase. To overcome this impedance, the mobile phase may be forced through the column under pressure, e.g., by the use of compressed air in the headspace in the mobile phase liquid reservoir. It is this circumstance, i.e., that the mobile phase must be pressurized, which provides a major source of trouble which limits the usefulness of columnized liquid-liquid extraction. For example, pressurization requires a host of auxiliary equipment, such as gas pressure reservoirs, pressure lines, leak tight connections, manometric equipment and the like, which is troublesome, per se, in operation. Far more serious, however, is the danger that all or part of the column will run dry, which occurs when the level of the mobile phase falls below the column entrance. Since this destroys the requisite separation conditions in the column, it is always necessary to monitor the liquid level in some manner, leading to additional complication. Moreover, if more than one mobile phase fluid or eluant are necessary in the separation, all problems are multiplied and the procedure becomes increasingly cumbersome and time-consuming. Accordingly, practical use of reverse phase partition chromatography, a potentially versatile and effective procedure, has been limited almost exclusively to separating substances having very similar distribution coefficients, and preferably with separation schemes employing a minimal number of eluant phases, since the tedious and time-consuming nature of the operation cannot otherwise be economically justified.

There are also known in the polymer art, although not in association with column substrates for liquid-liquid extractions, certain graft copolymers which consist of two or more monomer types having hydrophilic and hydrophobic or organophilic character. These substances have the rather interesting property that they interact with both organic and polar liquids. However, these materials have not in the past been particularly useful as packing materials for chromatographic columns due to their low chemical stability and high solubilities in certain solvents.

I have attempted to enhance the chemical stability of graft polymers having mixed hydrophobic and hydrophilic functional groups by crosslinking such compounds, e.g., by polymerization under the influence of ionizing radiation and/or suitable initiators. While I have found that the polymers so treated are indeed able to withstand the action of organic and inorganic fluids of wide pH ranges, their performance as column substrates has been disappointing because the concentration of the various chemical species discharged in the effluent decreases too slowly with time from a maximum to zero. This condition is known in the art as "tailing," which is descriptive of the shape of the output concentration vs. discharge time graph. Ideally, the concentration of any species fed into the column should rise abruptly to a maximum and drop back to zero quickly at a distinct point in the liquid flowing through the column. Due to the tailing phenomenon noted above, successive output peaks overlap, which overlapping, i.e., intermixing, comprises the purity of the individual species collected. Although not completely understood, it is believed that the highly convoluted microstructure of the crosslinked materials traps some of the solute molecules and releases them only slowly to the mobile phase. In any event, such crosslinked materials have not been found especially suitable as liquid-liquid partition chromatographic column substrates.

Accordingly, a principal object of the present invention is to provide a support substrate for liquid-liquid partition chromatographic columns which is capable of absorbing the stationary liquid phase, and will offer little or no resistance to the flow of the mobile phase.

Another object of the invention is to provide a substrate material which is chemically inert, is insoluble in a wide range of organic and inorganic solvents, including strong acids and bases, and which will not give rise to the condition known as "tailing."

A still further object of the invention is to provide a method for rapidly carrying out a columnar liquid-liquid partition separation of solute species which differs markedly in their distribution coefficients.

These and other objects will become apparent upon consideration of the following specific description, in conjunction with the drawings, in which:

FIGURE 1 represents a preferred liquid-liquid extraction column for separating substances which differ substantially in their distribution coefficients; and FIGURE 2 is a graph of various rare earth elution peaks obtained by separating the rare earth elements by means of liquid-liquid extraction through the present substrate materials.

Summary

A principal aspect of the present invention is in the provision of a unique family of graft copolymers which comprise a base of dense macro particles of a polymeric, relatively inert material, such as polytetrafluoroethylene and polytrifluorochloroethylene which is modified in its chemical and surface properties by the provision of selected polymeric functional substituent sidechains which are chemically bonded to the surface of the dense base particles to provide the requisite properties. As used in the context of the present application, with reference to the nature of the base material, the term "macro particle" is used to indicate that the base material is not present in a stoichiometric adsorptive or reactive quantity, but rather is in the form of a dense solid particle having an impermeable solid core polymeric resin material. The sidechain substituents are attached to the surface of the core of the substrate particle, rather than to any particular position on the molecules making up the core. The size of the "macro particles," while not especially critical, generally ranges between 100 and 325 mesh. The term "dense" is used to denote the property of being relatively impermeable to solvents, be it due to the crystalline structure of the material, close interatomic distances, or electrical properties. This bulk property can be empirically determined by the degree of swelling of the base material in solvents, which degree of swelling should be well below about 1% by weight.

The sidechain substituents comprise at least two principal types of molecular fragments, e.g., one type bearing functional groups which are adsorptive with respect to one of the liquid phases in the extraction system, e.g., a non-polar organic phase, and another type bearing functional groups which attract the second extraction liquid, which may be a polar liquid, such as water. Throughout the present application, the term hydrophilic is used, since, as a practical matter, in the overwhelming majority of liquid extractions, water is used as the eluant phase. It is to be understood, however, that any non-aqueous eluant could be used as well, together with the appropriate sidechain material having wetting characteristics with respect to this eluant. These molecular fragments are copolymerized with the substrate material and also among themselves, in an intimately intermixed order, both types of sidechains being bonded to the surface of any one base particle in order to offer both liquid phases a continuous maze of adjacent sites capable of attracting or having selective affinities for particular solute materials extending throughout the bulk of the packing material as assembled in a column. I have found that, by virtue of this bulk structure of a quantity of the material, the present graft copolymers are capable of firmly adsorbing several immiscible liquids. Still more important, both type liquids flow freely and with little hindrance through the interstices of the substrate material. Thus, a column packed with the present surface grafted polymeric particulate substrate, saturated with the liquids, can effectively transmit solvent fluid or fluid mixtures merely by the force of gravity alone, e.g., without pressurization of any kind, and without running dry. It is this property which makes the present graft copolymer packings ideally suited for liquid-liquid partition or extraction chromatography.

In principle, the class of substituents which may be utilized to produce the particle surface grafted copolymers outlined in the above description encompasses essentially selected polymerizable monomers having the required solvent-attracting properties and capable of undergoing a graft copolymer forming reaction, with the particle base polymer being any of those suitable for use with or compatible with the solvents to be employed in the extraction process. In general, fluorinated polymers such as polyfluoroethylene or polyhalo polymers such as polytrifluorochloroethylene are preferred, since they are insoluble in a large number of solvents. Under less demanding conditions, polyethylene, polypropylene, polyvinylchloride or the like might be employed. Specific materials useful for any one liquid-liquid extraction are thus ultimately determined by the solvent-liquids of the stationary and eluant phases used in the extraction procedure. Given the solvents, one can thus choose an appropriate base material and sidechain constituents from the comprehensive tabulations of requisite properties avilaable in the literature. Some common solvents and appropriate materials for synthesizing a packing material useful for each are given in the table below.

TABLE I

| Solvent | Polymer type (for sidechains) |
|---|---|
| Water and water miscible alcohols. | Poly(ethylene glycol). Poly(vinyl alcohol). Poly(acrylic acid). Polyacrylamide. Starches, dextrins and other polysaccharides. Cellulose. |
| Dimethylformamide | Polyacrylonitrile. |
| Dioxane | Poly(methyl methacrylate). |
| Carbon disulfide | Poly(methyl acrylate). |
| Acetonitrile | Poly(ethyl acrylate). |
| Nitromethane | Poly(vinyl acetate). |
| Tetrahydrofuran | Polystyrene. |
| Ethyl acetate | Poly(n-butyl methacrylate). |
| Methyl ethyl ketone | Poly(isobutyl methacrylate). Poly(n-butyl acrylate). |
| Diisobutyl ketone | Poly(n-butyl methacrylate). |
| Diethyl ether | Poly(isobutyl methacrylate). Poly(n-butyl acrylate). |
| Cyclohexane | Polystyrene. |
| Benzene | Polydimethyl siloxane. |
| Toluene | Poly(methyl methacrylate). |
| Carbon tetrachloride | Poly(methyl acrylate). |
| Chloroform | Poly(ethyl acrylate). |
| Dichloroethane | Poly(vinyl aetate). Poly(n-butyl methacrylate). Poly(isobutyl methacrylate). Poly(n-butyl acrylate). |

The weight relationships of the sidechain and base particle constituents are determined by the weight increase of the base polymer after grafting and thorough separation of the grafted product from the unreacted residue. The total percentage of both grafted sidechain constituents should be between about 2% by weight to about 18% by weight of the total. These weight ratios are not too well defined. In the lower percentage region, e.g., a sidechain content of up to about 5% by weight, the bulk behavior of the material improves progressively, both with respect to the quantity of stationary phase retained and the flow rate of eluant passing through the graft. The optimum behavior of the column packing material is between about 10 and 12% by weight of sidechain constituents. At around 18 to 20% by weight, the "tailing" problem referred to above sets in, which is thought to be due to the increased material thickness and volume occupied by the sidechain constituents, which appears to become large enough to entrain and delay some of the eluate.

Since the determination of the weight ratio of hydrophilic and organophilic sidechains is very difficult to determine by analysis of the graft copolymer, it is preferable to state this weight relationship in terms of their concentration in the reaction mixture prior to copolymerization, although the amounts ultimately grafted to the substrate depends on a number of variables, as further discussed below. On the basis of the starting concentrations the ratio between the hydrophilic and organophilic material is between about 1:3.5 and about 1:1. As determined by material balance methods, a very satisfactory column material has a ratio of about 1:1.5 of grafted hydrophilic and organophilic sidechains.

From the materials given in the table and on the basis of state of the art knowledge regarding compatibilities and behavior of chemical compounds, a large class of packing materials can be synthesized, each one of which being adequate for use with some specific solvent pair. For example, for the common extraction system, dimethylformamide (DMF)-water, where DMF is the usually stationary phase and water the eluant phase, a medium having a mixture of polyacrylonitrile and polyacrylamide copolymerized and grafted as a surface layer upon polytetrafluoroethylene particles could be employed. The polyacrylonitrile sidechains serve to adsorb the stationary DMF phase, whereas the polyacrylamide portion of the graft copolymer attract and guide the aqueous phase. The method of synthesizing these graft copolymers is discussed in detail below. While this graft copolymer is an excellent support for the DMF-water system, it should not be used at extreme pH values, due to the fact that the sidechain materials tend to hydrolize.

Many of the combinations of sidechain materials and base materials are highly specific, in the sense that they may work well with a few solvent systems, but not with others.

However, I have also developed a preferred substrate material which can be used with a wide variety of solvent systems. This preferred substrate material comprises a base of polytrifluorochloroethylene in the form of a powder of a size between 100 and 325 mesh. In the preferred substrate, the sidechains which are grafted to the base particle surfaces are comprised of polyethylene glycol and polystyrene and copolymers thereof, hereinafter referred to as poly(ethylene glycol-g-styrene). The polymeric composite particle substrate obtained by the foregoing procedure is attacked only by very caustic chemical agents, such as powerful oxidizing agents in strong acid solution by virtue of the complete absence of reactive functional groups or other reactive sites therein. Thus the substrate material can be used universally in extraction chromatography without degradation, i.e., even with highly acidic and basic media.

The polyethylene glycol constituents are hydrophilic, and have an affinity for polar liquids and solvents generally, whereas the polystyrene chain portions have an affinity for and attract organic and non-polar solvents and liquids. By virtue of the impermeability of the polytrifluorochloroethylene base particles to the solvent or liquids in contact therewith, the effective interstitial space accessible to solvent interaction in the bulk of the material is limited to sites situated between the grafted adjacent sidechain layer on the surface of the particles. The eluant phase is held in these interstitial spaces by the adsorptive properties of the sidechains and by capillary action, providing a persistent superficial layer of fluid therein. Accordingly, while excess liquid of either type will freely migrate through the bulk, displacing the adsorbed fluid along the sequence of sites which attract it in accord with usual chromatographic column operation, the substrate does not run dry since at least a persistent surface layer of fluid remains imbibed in the grafted copolymer layer. On the other hand, this layer of grafted copolymer which is provided on the surface of the substrate particle is of a thickness and of a structure such that rapid interchange with little delayed holdup occurs on contact with the partition solvent system, so that rapid and efficient separation or adsorption of solutes occurs without undue "tailing."

Synthesis of column support materials

In general, the crucial step in the synthesis of the present column packing materials is the copolymerization and grafting of the ingredients of the surface layer of the packing material, since it ultimately determines the nature in which the material is linked. For example, if it is desired to provide a bulk material having the majority of hydrophobic and hydrophilic sidechains attached to the base particles individually, these polymers are produced separately and a mixture of both polymer species is then grafted to the base particles by irradiating a mixture thereof, including some vinylic monomers, for example. The polymerized product is then washed to remove ungrafted particles to produce a product with a substantial fraction of individual sidechains of either the hydrophobic or hydrophilic types and, of course, some copolymerized sidechains.

As indicated above, the preferred packing material is comprised of an inert polymer base particle bearing a surface layer of copolymerized hydrophilic and hydrophobic sidechain constituents, since in this structure, hydrophilic and organophilic sites are more intimately dispersed which enhances the ability of the resin bulk to hold and transmit the liquid phases. To synthesize such a material, monomeric or prepolymerized precursor sidechain material of selected types is copolymerized to adhere to the surface of the base powder particles by exposure to ionizing radiation.

Since the preferred base material is generally chemically unreactive, i.e., not subject to catalytically induced polymerization, the ultimate graft of the sidechain substituents of the invention is preferably accomplished by irradiation of a mixture of the base material particles in contact with the sidechain polymer. General requirements of radiation polymerization processes, per se, are well known and are discussed in detail in the literature. More particularly, an intimate mixture of selected prepolymerized materials, partially polymerized materials, monomers, and mixtures thereof, together with crosslinking agents and suitable solvents, if appropriate, is first prepared.

The reaction mixture is then irradiated with a dose of about 10,000–$10^6$ rads. Subsequently, the polymerized reaction product is separated from the mixture by filtering and washing the precipitate with suitable solvents for removing solvent, low molecular weight polymer, unpolymerized monomers, etc., and drying.

The values of two typical polymerization runs are given below in Table II.

TABLE II

| Irradiation No | 808-8 | 808-9 |
| --- | --- | --- |
| Mesh size of Kel-F Powder | −325 | 259-325 |
| Wt. of Kel-F Powder (grams) | 100.0 | 70.0 |
| Wt. of Carbowax 20M | 10.5 | 8.4 |
| Wt. of styrene monomer | 21.0 | 16.8 |
| Dose (rads) | 400,000 | 400,000 |
| Irradiation time (hours) | 48 | 48 |
| Wt. of modified Kel-F product [1] | 112.5 | 78.8 |
| Wt. of unreacted Carbowax | 6.4 | 5.1 |
| Wt. of unreacted styrene | 6.1 | 4.0 |
| Wt. of soluble graft copolymer [2] | 6.5 | 7.3 |
| Wt. of Carbowax on Kel-F Powder [3] | 3.8 | 3.0 |
| Wt. of polystyrene on Kel-F Powder [3] | 8.7 | 5.8 |
| Polystyrene/Carbowax weight ratio | 2.3 | 1.9 |

[1] After thorough washing and drying.
[2] Chemical analysis: 4.6 Carbowax, 95.4% polystyrene. Includes polystyrene homopolymer produced in reaction.
[3] By difference.

The irradiation time and dose rate have, of course, some influence upon the chainlength of the grafted materials, the degree of copolymerization among the sidechains themselves, as well as the total amount of sidechain material grafted to the base powder. Accordingly, an increase in the irradiation parameters will result in a corresponding change in each of these properties, i.e., chainlength, degree of copolymerization, and base particle weight increase.

EXAMPLE I

A batch of a preferred packing material of poly (ethylene glycol-g-styrene) modified polytrifluorochloroethylene was prepared by dissolving 20 g. of polyethylene glycol (Carbowax 20M, Union Carbide Company), and 40 ml. of styrene in 40 ml. of methanol. The resulting solution was then mixed with about 200 g. of polytrifluorochloroethylene powder, irradiated with fission product gamma rays (from a spent reactor fuel element) at a rate of about 30,000 rads/hr. for about 20 hours. After irradiation, the solution was filtered and ungrafted styrene and Carbowax polymers removed from the filtrate by washing the insoluble polymer with toluene. The residue, i.e., the substrate particle bearing a surface layer of grafted copolymer, was then washed in methanol to remove toluene and dried.

Other exemplary graft copolymer substrate formulations especially suited for the indicated extraction solvent system are the following:

EXAMPLE II

For water-dioxane extractions:

| | Percent by weight |
| --- | --- |
| Polyvinyl alcohol | 25 |
| Vinyl acetate monomer | 25 |
| Polytrifluorochloroethylene powder | 50 |

EXAMPLE III

For alcohol or water-methyl ethyl ketone extractions:

| | Percent by weight |
| --- | --- |
| Polyacrylamide | 15 |
| n-Butyl alcohol monomer | 35 |
| Polytetrafluoroethylene powder | 50 |

EXAMPLE IV

For water-cyclohexane extraction:

| | Percent by weight |
| --- | --- |
| Polyacrylic acid | 20 |
| Dimethyl siloxane monomer | 30 |
| Polymeric amide (nylon) powder | 50 |

EXAMPLE V

For water-chloroform extractions:

| | Percent by weight |
| --- | --- |
| A water soluble starch | 25 |
| Ethylacrylate monomer | 25 |
| Polypropylene powder | 50 |

Each of the components given in Examples II–V are mixed, copolymerized by radiation, washed and dried, as indicated in Example I.

EXAMPLE VI

A group of rare earths was separated by passing a dilute H-Cl solution of these rare earths through a column packed with the substrate material of Example I. The active portion of stationary phase was the organic complexing agent di-(2-ethylhexyl)orthophosphoric acid. The output of the column is shown in FIGURE 2. The eluant was passed through the column without the application of pressure or force of any kind. The absence of "tailing" is evidenced by the sharp drop-off of the neodynium and europium peaks.

Preparation of columns

In general, chromatography columns are packed with the present substrate in a conventional manner, i.e., the graft copolymer particulate packing medium is stirred with the liquid which is to be used as the stationary phase, e.g., generally an organic complexing agent or a solution thereof. After thoroughly soaking the packing medium in the stationary phase liquid, it is stirred into a bath of the material used for the mobile phase, which is usually water or an aqueous phase. The thoroughly wetted graft copolymer is then carefully packed into an elongated tubular column, preferably between two thin layers or plugs of a porous material such as glass powder or glass wool at the top and bottom ends of the column. In accord with usual practice, the packing material should be emplaced carefully in small quantities at a time in the column, making sure that the column is packed uniformly without void spaces by gently pressing the medium together.

In addition to providing a packing material for conventional columns for liquid-liquid partition of the type used in the separation of species having similar distribution coefficients, another important feature of the present invention is a column of the type depicted in FIGURE 1. This column is primarily intended for rapidly separating chemical species which differ appreciably in the magnitude of their distribution coefficients, i.e., by at least 20%, and comprises a generally funnel shaped glass envelope 11, the stem portion of which defines a relatively short tubular column 12 which terminates in a tapered tip 13. The tip retains a conical plug 14 of fritted glass or a similar porous inert material. The remainder of the column is packed with a column support material 16 comprising one of the graft copolymers disclosed hereinabove, as for example polyethylene glycol-g-styrene modified polytrifluorochloroethylene. A thin layer of glass powder 17 or the like is placed on top of the column support material for protection. The top end 18 of the glass column is flared to provide a bowl-shaped receptacle for solution to be separated.

The extraction column shown in FIGURE 1 is used in place of a separatory funnel for separating species which have markedly different mobilities through the column. The column packing medium is prepared as previously, and the solution of the chemical species transferred into the top end 18. The high mobility chemical species is eluted rapidly and is collected with the eluant in a suitable receptacle placed beneath the funnel. The slow moving species are retained in the column in the superficial interstitial fluid volume.

The principal advantages of this separator are its low cost, allowing it to be made as a disposable item, and also its small size and low space requirement, and that it does not have to be shaken or agitated. Thus, for use as in a conventional sealed glove box, the storage and use of as few as 12 separating funnels is exceedingly problematical, as many as 100 separators of the type described can easily be accommodated and effectively used.

It will be readily realized that a number of the present separators may be prepared with different absorbed or stationary phases and used successively to eliminate different species as necessary for the isolation of a desired fraction or further resolution of eluates obtained in previous separations. It is also possible to provide a suitable flow control device at the end of the column, for example, to adjust the flow velocity of the mobile phase.

I claim:
1. A packing medium for use in liquid-liquid partition chromatography and providing a minimized tailing characteristic comprising:
   (a) dense impermeable inert substrate base particles of a fluorocarbon polymer selected from the group consisting of polytetrafluoroethylene and polytrifluorochloroethylene, said particles having a particle size in the range of about 100 to 325 mesh;
   (b) a mixture of hydrophilic and organophilic polymeric constituents in an amount in the range of about 2 to 18% by weight copolymerized and grafted so as to be attached by valence bonds as a layer disposed upon the surface of said particles,
   said hydrophilic constitutent being a material selected from the group consisting of polyacrylamide, starch, polyacrylic acid, polyethylene glycol, polyvinyl alcohol and celluose,
   said organophilic constituent being a material selected from the group consisting of polyacrylonitrile, polystyrene, polydivinylbenzene, polymethylmethacrylate, polydimethylsiloxane, polymethyl acrylate, polyethyl acrylate, polyvinyl acetate, poly(n-butyl methacrylate), poly(isobutyl methacrylate), and poly(n-butyl acrylate),
   said constitutents being derived of precursor material having a weight ratio in the range of about 1:1 to 1:3.5, hydrophilic to organophilic, respectively.

2. A packing medium as defined in claim 1 wherein said substrate base particles have a degree of swelling in said liquids below about 1% by weight.

3. A packing medium as defined in claim 1 wherein said hydrophilic and organophilic are copolymerized and grafted on the surface of said particles by exposure to an irradiation dose in the range of about $10^4$ to $10^6$ rads of gamma radiation.

4. The packing medium of claim 3, further defined in that the combined weight of said hydrophilic and organophilic constituents is between 10 and 12% by weight of said substrate base particles.

5. The packing material of claim 3, further defined in that the weight ratio of said hydrophilic to organophilic constituents is about 1:1.5, respectively.

6. A packing medium as defined in claim 1 wherein said hydrophilic constituent comprises polyethylene glycol and said organophilic constituent comprises polystyrene wherefor the surface layer comprises ethylene glycol-g-styrene copolymerized and grafted to the surface of said particles.

7. A packing medium as defined in claim 6 wherein the combined weight of said polyethyleneglycol and polystyrene constituents is in the range of about 5% to about 12% of the weight of the substrate particles.

8. A gravity flow liquid-liquid partition chromatography apparatus for separating chemical species having distribution coefficients differing by at least 20% comprising:
   (a) an elongated generally cylindrical tubular envelope of an insert material, said envelope defining an elongated tubular lower stem portion and an upper flared receptacle bowl portion communicating with said stem portion,
   (b) a packing medium disposed in the stem portion of said envelope, said medium comprising substrate particles having a size in the range of about 100 to 325 mesh of a fluorocarbon polymer selected from the group consisting of polytetrafluoroethylene and polytrifluorotrichloroethylene having polyethylene glycol and polystyrene in a weight ratio in the range of about 1:1 to about 1:3.5, respectively, copolymerized and grafted on the surface of said particles in an amount in the range of about 5 to 13% of the weight of said particles; and
   (c) porous plug means disposed within the lower end of said stem to retain said medium therein.

9. The apparatus of claim 8, further defined
   in that said stem portion terminates in a tapered annular outlet tip, and
   in that a layer of inert powdered material is disposed to cover the upper surface of the medium in said stem portion.

References Cited
UNITED STATES PATENTS

| | | | |
|---|---|---|---|
| 2,956,899 | 10/1960 | Cline | 204—159.17 X |
| 3,250,395 | 5/1966 | Blume | 210—198 X |
| 3,252,880 | 5/1966 | Magat et al. | 204—159.17 X |
| 3,279,919 | 10/1966 | Laridon et al. | 204—159.17 X |
| 3,298,942 | 1/1967 | Magat et al. | 204—159.17 |

FOREIGN PATENTS

| | | |
|---|---|---|
| 845,897 | 8/1960 | Great Britain. |
| 110,659 | 3/1961 | Pakistan. |

OTHER REFERENCES

"A comparison of Radiation-Induced Graft Copolymerization Utilizing Electron Accelerators and Isotope Sources As Radiation Initiators," Radiation Applications Incorporated of New York, bulletin NYO9420, Nov. 7, 1961, pp. 15–22.

JAMES L. DECESARE, Primary Examiner

U.S. Cl. X.R.

204—159.17